United States Patent

[11] 3,611,432

| [72] | Inventors | Robert E. Babcock<br>Hendersonville;<br>Charlie B. Turner, Hendersonville; Howard T. Jones, Flat Rock, all of N.C. |
|---|---|---|
| [21] | Appl. No. | 829,258 |
| [22] | Filed | June 2, 1969 |
| [45] | Patented | Oct. 5, 1971 |
| [73] | Assignee | General Electric Company |

[54] COMBINED OPERATING CIRCUIT FOR GASEOUS DISCHARGE AND INCANDESCENT LAMPS
9 Claims, 5 Drawing Figs.

[52] U.S. Cl. .................................................. 315/92,
 315/88, 315/93, 315/125, 315/135, 315/136, 315/360, 340/251
[51] Int. Cl. .......................................... H05b 41/46
[50] Field of Search .......................................... 315/86, 87, 88, 92, 93, 129, 135, 136; 340/251

[56] References Cited
UNITED STATES PATENTS

| 1,970,519 | 8/1934 | Dorgelo et al. ............... | 315/92 X |
| 2,043,023 | 6/1936 | Westendorp .................. | 315/92 X |
| 3,184,637 | 5/1965 | Skinner ........................ | 315/129 |

FOREIGN PATENTS

| 1,244,746 | 9/1960 | France .......................... | 315/136 |
| 378,476 | 10/1920 | Germany ...................... | 315/93 |

*Primary Examiner*—Roy Lake
*Assistant Examiner*—Darwin R. Hostetter
*Attorneys*—Sidney Greenberg, J. Wesley Haubner, Frank L. Neuhauser and Oscar B. Waddell ABSTRACT: Ballast circuit for a gaseous discharge lamp is combined with an incandescent lamp circuit and relay for turning the incandescent lamp on when the gaseous discharge lamp is extinguished.

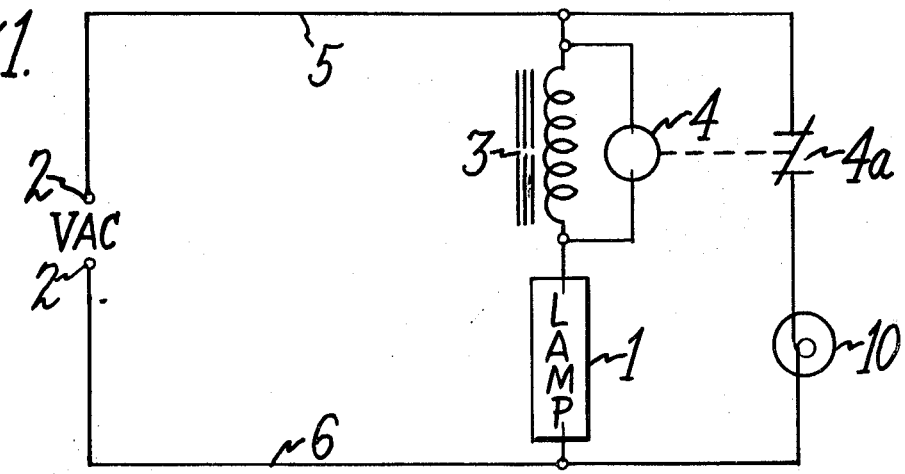
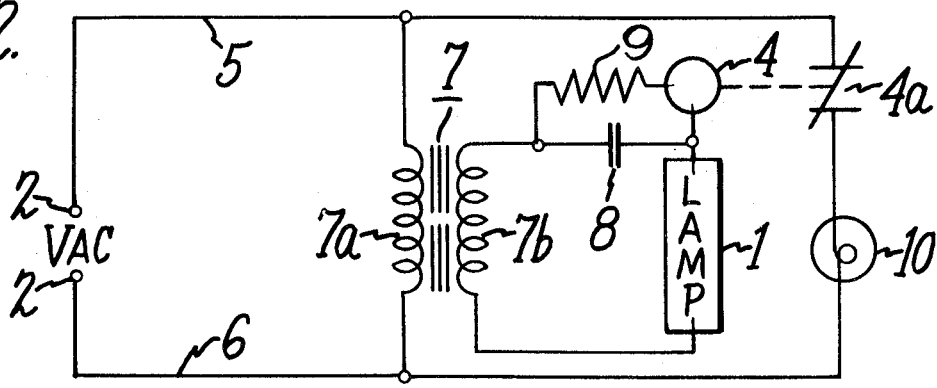
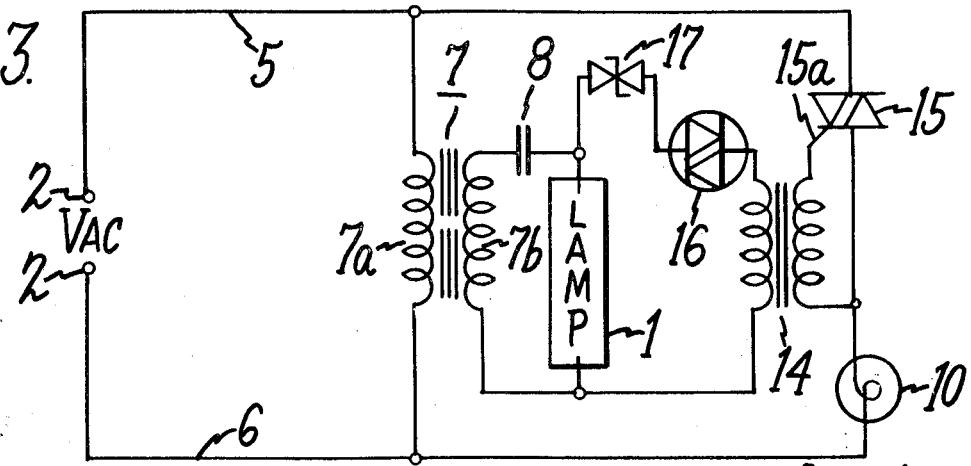

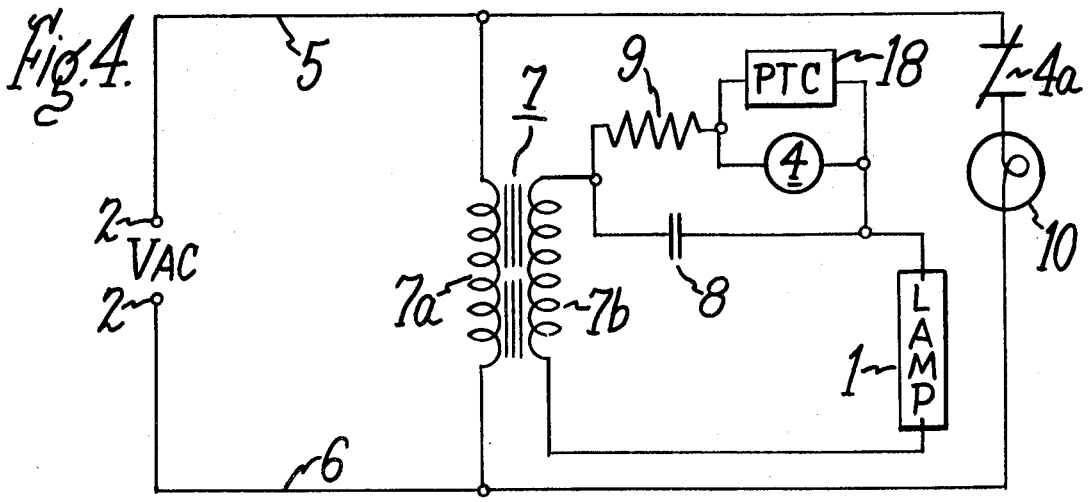
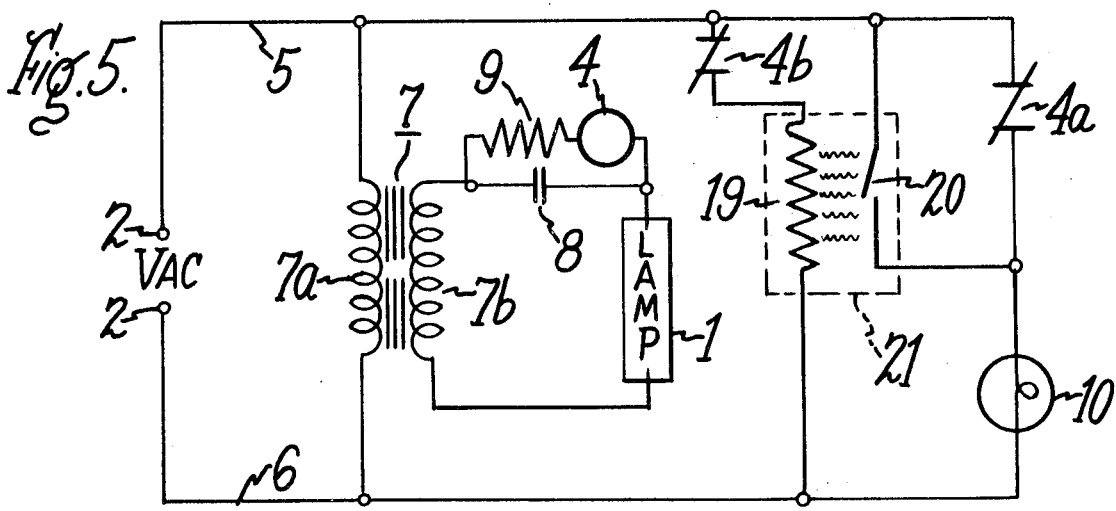

COMBINED OPERATING CIRCUIT FOR GASEOUS DISCHARGE AND INCANDESCENT LAMPS

It is an object of the invention to provide a combined operation circuit for a gaseous discharge lamp and an incandescent lamp whereby the incandescent lamp is automatically turned on when the gaseous discharge lamp is extinguished.

It is another object of the invention to provide a circuit of the above description whereby the incandescent lamp is automatically turned off when the gaseous discharge lamp is back in operation.

A further object of the invention is to provide a circuit of the above type wherein a time delay in turning off the incandescent lamp is provided after the gaseous discharge lamp is first reignited.

Other objects and advantages will become apparent from the following description and the appended claims.

With the above objects in view, the present invention in one of its aspects relates to a lighting system which comprises a source of electrical energy, a gaseous discharge lamp connected to the electrical energy, a gaseous discharge lamp connected to the electrical source, ballast means connected in series with the gaseous discharge lamp, an incandescent lamp connected to the electrical supply source in parallel with the discharge lamp, and relay means for rendering the incandescent lamp inoperative during operation of the discharge lamp and for automatically rendering the incandescent lamp operative when the discharge lamp ceases operation.

The invention will be better understood from the following description taken in conjunction with the accompanying drawings, in which:

FIG. 1 is a circuit diagram of an embodiment of the invention including a ballast comprising an inductive reactance;

FIG. 2 is a different embodiment of the invention incorporating a regulator ballast device;

FIG. 3 is a circuit diagram of another embodiment including a controlled semiconductor alternating-current switch and a triggering device therefor; and FIGS. 4 and 5 show modifications of the FIG. 2 circuit incorporating different time delay devices for delaying turning off of the incandescent lamp.

Referring now to the drawings, and particularly to FIG. 1, there is shown in operating circuit for a gaseous discharge lamp 1, such as a mercury vapor lamp, connected to terminals 2 of a source of alternating current in series with a ballast device comprising an impedance such as choke coil 3 which is an induction device providing linear reactance. When gaseous discharge lamp 1 is energized by the alternating-current source, reactor 3 serves as a ballast to provide a maximum current in the lamp circuit and limits the amount of current that can be drawn by the lamp, as conventional in the art. During operation of discharge lamp 1, voltage is present across reactor 3, whereas no voltage appears across the latter when lamp 1 is extinguished. When lamp 1 goes out due to interruption of supply current, or a drop in voltage across the line, or other causes, the lamp will not reignite until it has cooled off, even after normal supply current has been restored. As a result, the light from one or more luminaires using such gaseous discharge lamps and operated from the same electrical supply system may suddenly fail due to a transient fault in the system, and darkness will prevail for the several minutes necessary to allow the discharge lamps to cool sufficiently to permit reignition.

In accordance with the invention, this difficulty is overcome by providing an auxiliary lighting circuit in combination with the described ballast circuit, by means of which an incandescent lamp will automatically be turned on when the discharge lamp goes out and will automatically be turned off after the discharge lamp resumes normal operation. In the embodiment shown in FIG. 1, this auxiliary system comprises incandescent lamp 10 connected by conductors 5, 6 to supply terminals 2 in parallel with discharge lamp 1, and relay coil 4 connected across reactor 3 and having relay contacts 4a in series with incandescent lamp 10. In the operation of the illustrated embodiment, relay contacts 4a are normally closed, that is, when relay coil 4 is not energized. While discharge lamp 1 is in operation and voltage appears across reactor 3, relay coil 4 is energized and thereby opens contacts 4a, so that incandescent lamp 10 does not draw current and is not in operation. Should discharge lamp 1 be extinguished for any reason, no voltage appears across reactor 3 and relay coil 4 becomes deenergized, resulting in its contacts 4a closing and permitting current to flow to incandescent lamp 10 which accordingly turns on. After a sufficient period has elapsed, e.g., about 5 minutes, to enable discharge lamp 1 to cool off, it is automatically reignited by the supply voltage, and when current starts to flow in the reignited lamp 1, the resulting voltage across reactor 3 energizes relay coil 4 which then opens contacts 4a, thus turning off incandescent lamp 10.

FIG. 2 shows a different type of operating circuit for discharge lamp 1, which comprises a ballast transformer 7 having a primary winding 7a connected across supply terminals 2 and having a secondary winding 7b. Connected in series with the secondary winding and discharge lamp 1 is capacitor 8. Transformer 7 is a transformer having low reactance between primary and secondary windings, and the combination therewith of capacitor 8 which provides a controlled degree of saturation in the secondary magnetic circuit constitutes a so-called regulator ballast which provides lamp current regulation compensating for supply voltage variations. In this embodiment, relay coil 4 is connected across capacitor 8, and similarly to the operation of the FIG. 1 circuit, when discharge lamp 1 is operating, the voltage across capacitor 8 energizes relay coil 4 for maintaining its relay contacts 4a open, and when discharge lamp 1 ceases operation, no voltage appears across capacitor 8 to energize relay coil 4, and therefore incandescent lamp 10 is rendered operative. In practice, a current limiting or impedance-matching resistor 9 is arranged in series with relay coil 4 as shown.

In the embodiment shown in FIG. 3, means are provided for sensing the rise in ballast output voltage when the discharge lamp extinguishes and using this voltage to turn on the incandescent lamp. In the illustrated arrangement, triac 15 is placed in series with incandescent lamp 10. A triac is an alternating current semiconductor controlled switch having a single control electrode which, when gated, causes the switch to conduct current in the direction as indicated by the forward bias condition of the semiconductor. Connected to the control electrode 15a of the triac via pulse transformer 14 is a symmetrical (bilaterally conducting) voltage-sensitive switch such as diac 16 which becomes conductive only upon application of a predetermined breakdown voltage. Other types of voltage-sensitive switches such as a neon glow lamp or silicon bilateral switch may be used instead of a diac, if desired. Connected in series with diac 16 is a voltage-clamping device such as a double Zener device 17 which serves to block voltage to diac 16 until it reaches a predetermined reference level, which is approximately the operating voltage of discharge lamp 1, e.g., about 135 volts. When discharge lamp 1 goes out, the open circuit voltage in the secondary circuit increases substantially, e.g., to about 250 volts, and the voltage exceeding the Zener level renders the Zener device 17 conductive and is sufficient to turn on diac 16, which typically may have a breakdown voltage of about 30 volts. When diac 16 thus becomes conductive, it triggers or "fires" triac 15 through its control electrode 15a and renders it conductive, thereby turning on incandescent lamp 10. Once discharge lamp 1 becomes operative again, the voltage in the trigger triggering circuit drops to below the Zener level and diac 16 no longer fires triac 15, which is thus rendered nonconductive, and incandescent lamp 10 ceases operation.

When gaseous discharge lamps of metal-vapor type, such as mercury vapor lamps, are first ignited, a period of up to about 5 minutes elapses before the lamp achieves full operating brightness. In view of this, it may be desirable to provide a time delay between the time the discharge lamp is first ignited and the incandescent lamp is turned off.

FIG. 4 shows a circuit of the type depicted in FIG. 2 in which such a time delay is provided. For this purpose, there is connected across relay coil 4 a temperature-sensitive resistor 18 (thermistor) which has a positive temperature coefficient (PTC), whereby it increases in resistance with an increase in temperature. Such PTC thermistors are readily available commercially, and a particular type which may be employed in practicing the invention is in the form of a disc composed mainly of barium titanate.

In the operation of the FIG. 4 arrangement, PTC element 18 draws some current in parallel with relay coil 4 while discharge lamp 1 is operating, but the current in relay coil 4 is sufficient to energize the relay and keep the relay contacts 4a open during this time. When discharge lamp 1 goes out, no current passes through the relay coil branch or PTC element 18, and the latter accordingly becomes cooler during the period that discharge lamp 1 cools off before it can ignite. When lamp 1 does ignite, current is drawn through resistor 9 and PTC element 18 rather than through relay coil 4, since PTC element 18, being cool, has reduced resistance and draws sufficient current away from relay coil 4 to prevent energization of the latter, and therefore incandescent lamp 10 remains on. However, as the higher level of current passes through PTC element 18, the temperature of the latter gradually increases and it thereby exhibits increasing resistance so that less current passes therethrough, until after a period of time, during which discharge lamp 1 has achieved full operating brightness, sufficient current passes through relay coil 4 to energize it and cause incandescent lamp 10 to turn off.

FIG. 5 shows a different embodiment of a time delay arrangement in a circuit such as that of FIG. 2 in which a heating resistor 19 in series with relay contact 4b of relay coil 4 is connected across the line, and thermal switch 20 is connected across relay contact 4a. As shown, heating resistor 19 is arranged in thermal contact relation with normally open thermal switch 20, and these components in practice may be arranged in a suitable enclosure 21 for this purpose. In the operation of this embodiment, when discharge lamp 1 is in normal operation, relay coil 4 is energized and both contacts 4a and 4b thereof are open and incandescent lamp 10 is off. When discharge lamp 1 goes off, relay coil 4 is deenergized and its contacts 4a and 4b close. As a result, incandescent lamp 10 turns on, and heating resistor 19 draws current, increasing in temperature and thereby closing thermal switch 20. When discharge lamp 1 eventually cools off and reignites, relay coil 4 is energized and opens its contacts 4a and 4b. However, thermal switch 20 remains closed and permits current to flow to incandescent lamp 10 until the thermal switch cools off, as a result of which thermal switch 20 eventually opens and incandescent lamp 10 turns off. By this time, discharge lamp 1 has reached full operating brightness.

While the present invention has been described with reference to particular embodiments thereof, it will be understood that numerous modifications may be made by those skilled in the art without actually departing from the scope of the invention. Accordingly, we wish to have it understood that we intend therein to cover all such modifications as fall within the true spirit and scope of our invention.

What we claim as new and desire to secure by Letters Patent of the United States is:

1. Lighting system comprising, in combination, a source of alternating current, a gaseous discharge lamp connected to said source, ballast means connected to said source including impedance means connected in series with said gaseous discharge lamp, an incandescent lamp connected to said source, and actuating means connected to said ballast means and said incandescent lamp for rendering said incandescent lamp inoperative during operation of said discharge lamp and for automatically rendering said incandescent lamp operative when said discharge lamp ceases operation, said actuating means comprising relay means having a coil connected across said impedance means and switch contacts connected in series with said incandescent lamp, said switch contacts being open when said relay coil is energized and closed when said relay coil is deenergized.

2. Lighting system as defined in claim 1, said impedance means comprising an induction coil.

3. Lighting system as defined in claim 1, said ballast means comprising a transformer having primary and secondary windings, said discharge lamp being connected to said secondary winding, said impedance means comprising a capacitor connected in series with said secondary winding.

4. Lighting system comprising, in combination, a source of alternating current, a gaseous discharge lamp connected to said source, ballast means connected to said source including impedance means connected in series with said gaseous discharge lamp, an incandescent lamp connected to said source, and actuating means connected to said ballast means and said incandescent lamp for rendering said incandescent lamp inoperative during operation of said discharge lamp and for automatically rendering said incandescent lamp operative when said discharge lamp ceases operation, said actuating means comprising controlled semiconductor switch means in series with said incandescent lamp, and triggering means connected across said gaseous discharge lamp and to said semiconductor switch means for rendering the latter means conductive when said discharge lamp ceases operation.

5. Lighting system as defined in claim 4, said triggering means comprising voltage-sensitive switch means.

6. Lighting system comprising, in combination, a source of alternating current, a gaseous discharge lamp connected to said source, ballast means connected to said source including impedance means connected in series with said gaseous discharge lamp, an incandescent lamp connected to said source, actuating means connected to said ballast means and said incandescent lamp for rendering said incandescent lamp inoperative during operation of said discharge lamp and for automatically rendering said incandescent lamp operative when said discharge lamp ceases operation, said actuating means comprising controlled semiconductor switch means in series with said incandescent lamp, and triggering means connected across said gaseous discharge lamp and to said semiconductor switch means for rendering the latter means conductive when said discharge lamp ceases operation, said triggering means comprising voltage-sensitive switch means, said controlled semiconductor switch means comprising a triac, said voltage-sensitive switch means comprising a diac, and a semiconductor voltage-clamping device connected in series with said diac.

7. Lighting system comprising, in combination, a source of alternating current, a gaseous discharge lamp connected to said source, ballast means connected to said source including impedance means connected in series with said gaseous discharge lamp, an incandescent lamp connected to said source, actuating means connected to said ballast means and said incandescent lamp for rendering said incandescent lamp inoperative during operation of said discharge lamp and for automatically rendering said incandescent lamp operative when said discharge lamp ceases operation, and time delay means connected to said actuating means for delaying turning off of said incandescent lamp for a predetermined period after reignition of said discharge lamp.

8. Lighting system as defined in claim 7, said actuating means comprising relay means having a coil connected across said impedance means and switch contacts connected in series with said incandescent lamp, said switch contacts being open when said relay coil is energized and closed when said relay coil is deenergized, said time delay means comprising temperature sensitive resistor means having a positive temperature coefficient connected across said relay coil.

9. Lighting system as defined in claim 7, said actuating means comprising relay means having a coil connected across said impedance means and switch contacts connected in series with said incandescent lamp, said switch contacts being open when said relay coil is energized and closed when said relay coil is deenergized, said time delay means comprising heating resistance means and relay contact means actuated by said relay coil connected in series across said incandescent lamp, and thermal switch means connected across said first-mentioned relay switch contacts and arranged in thermal contact with said heating resistance means, said relay contact means being open when said relay coil is energized and said thermal switch means being normally open.

Disclaimer 3,611,432.—*Robert E. Babcock* and *Charlie B. Turner*, Hendersonville and *Howard T. Jones*, Flat Rock, N.C. COMBINED OPERATING CIRCUIT FOR GASEOUS DISCHARGE AND INCANDESCENT LAMPS. Patent dated Oct. 5, 1971. Disclaimer filed Apr. 14, 1977, by the assignee, *General Electric Company*.

Hereby enters this disclaimer to claims 4, 5, 6 and 7 of said patent.

[*Official Gazette July 12, 1977.*]